Sept. 17, 1957    H. JACOBS    2,806,677
METALLIC HEAT EXCHANGER FOR HIGH TEMPERATURE GASES
Filed Sept. 1, 1955

INVENTOR.
HEINZ JACOBS
BY
W. H. Sullivan
ATTORNEY

United States Patent Office 2,806,677
Patented Sept. 17, 1957

2,806,677

METALLIC HEAT EXCHANGER FOR HIGH TEMPERATURE GASES

Heinz Jacobs, Geldern, Germany, assignor to Industrie-Companie, Krefeld, Germany Application September 1, 1955, Serial No. 531,942

Claims priority, application Germany September 10, 1953

5 Claims. (Cl. 257—246)

The present invention relates to a metallic recuperator of the kind for cooling high-temperature air or gases in heat exchange with air or any other gas.

The use of recuperators for heat exchange of high-temperature gases causes difficulties, since, even when highly heat-resistant materials are employed, sealing phenomena and the formation of cracks occur, owing to excessively high or non-uniform wall temperatures.

In order to protect, for instance, metallic recuperators from excessive temperatures, dilution air has hitherto been admixed with the current of waste gas. Since it often happens—especially if the mixing distance is short—that the intermixture is not complete, "strands" of flue gas at high temperature are formed which, in places, overload the recuperators. Moreover, the admixture of cooling air has an unfavorable influence on the temperature difference between the current of flue gas and the medium, e. g. air to be heated, and the volume of gas required to be exhausted (flue gas and cooling air) is increased.

The present invention consists in a metal heat exchanger of the kind specified, comprising a tubular body with a number of ribs, longitudinally disposed outside and around said body in close proximity thereto, a jacket surrounding said body and ribs, an annular passage being thereby obtained between said body and said jacket, a channel and a number of vanes, the channel and the vanes being disposed around and adjacent one extremity of the said jacket and tubular body and being such that, when, in the use of the recuperator, hot gases are caused to flow through the tubular body, and air or gas to be heated is made to flow through the annular passage between the jacket and the tubular body, the air or gas can be caused to flow firstly through the channel and hence past the vanes, which impart a twisting motion to the air prior to entering said annular passage.

It has been found that, using this recuperator, it is unnecessary to admix air with the hot gases or flue gases prior to admission within the recuperator.

An intensive cooling is achieved in such a way that the tube wall temperature is equalized to the greatest possible extent over the periphery and also along the tube axis if the air and the flue gases are passed through in the same direction. In this manner, stressing of the recuperator and the formation of cracks connected therewith are avoided.

In practical construction, the guide vanes are arranged on the flanges of the recuperator and are covered by a flange of the sheet metal jacket which, in turn, is covered by a sheet metal hood, forming the air or gas inlet or outlet annular channel. This results in a very simple construction of the whole recuperator. The cross-section of the annular channel is so chosen that the air is uniformly distributed therein over the periphery and is practically motionless. The air thus dammed escapes through the narrow annular slot, and in so doing is accelerated in the said slot. The guide vanes impart a twisting movement to the current of air, so that it impinges at right angles on the ribs of the recuperator tube, thus achieving a strong vortex effect and consequently an intensive cooling of the part of the recuperator subjected to the greatest stress, at the hot or flue gas inlet. The guide vanes act as cooling ribs for the foot of the recuperator tube at the same time.

One constructional example of a recuperator is illustrated diagrammatically in the drawing, wherein.

Figure 1:
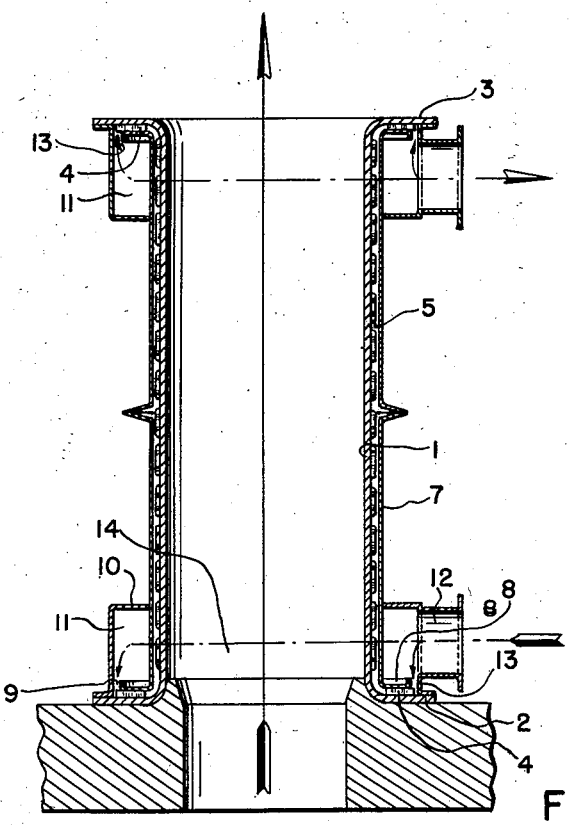
Figure 1 is a vertical sectional view.
Figure 2:
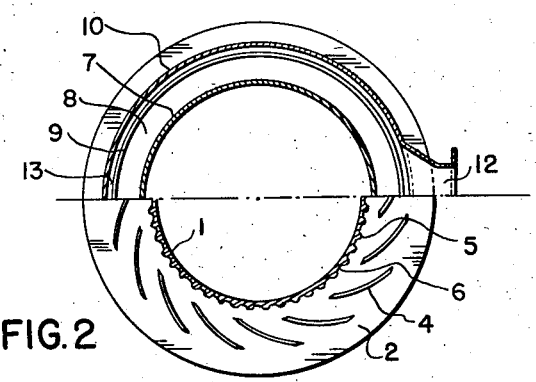
Figure 2 is a horizontal sectional view, half showing the annular channel without the recuperator tube and the other half the recuperator tube above the guide vanes.

The recuperator consists of a tubular body 1 with a foot flange 2 and a head flange 3. The flanges are provided with guide vanes 4 which, as shown in Figure 2, impart a twisting movement to the through-flowing air or gas. The cylindrical part of the recuperator 1 is provided with parallel cooling ribs 5, the spaces between which form throughflow channels 6. Arranged about the recuperator is a sheet metal jacket 7 which leaves only a very small gap between the ribs and the inner wall of the jacket, and which is provided with an expansion joint at the central zone of the jacket.

The cooling jacket 7 is also provided at both ends with flanges 8 which are provided with an upturned edge portion 9 thereabout. This flange 8 bears on the guide vanes 4.

Fitted over the flanges 8 is a sheet metal hood 10 which is fastened to the cylindrical jacket 7 or flanges 2 and 3. There is thus formed a large annular channel 11 in which the air or gas supplied through the stub pipe 12 becomes dammed. The air or gas then flows out of this annular channel 11 through the annular slot 13 between the portion 9 and the hood 10 at a high speed and is then given a twisting movement by the guide vanes 4, so that the air impinges at right angles on the flanks of the ribs 5. An intensive cooling of the recuperator is thus achieved, at the hot or flue gas inlet 14.

The outlet end, at the flange 3, can be provided in the same way with an annular channel 11, an annular slot 13 and the guide vanes 4.

Gas or air inlet and outlet ducts 12 can be arranged radially, as indicated in Figure 2, or tangentially to the annular channels 11.

In order to achieve greater air or gas heating and further utilization of waste heat, it is possible in known manner to connect a plurality of recuperators in series or in parallel. By reason of the considerable cooling of the tube wall which can be obtained, it is also possible to use the recuperator itself as a combustion chamber, a flame burning directly into the recuperator tube 1, so that air or gas heating can be carried out by applying direct heat. For increased heat utilization a convection-type heat exchanger of known construction can be connected after the waste gas outlet side of—and parallel or in series before the air side of—the recuperator.

The recuperator has been illustrated and described as being disposed in a vertical position but it is understood that it may be disposed in an inclined or horizontal position.

I wish it to be understood that I do not desire to be limited to the exact details of construction shown and described, for obvious modification will occur to persons skilled in the art.

What I claim is as follows:

1. A metallic recuperator comprising a tubular body adapted to be heated and having spaced longitudinally extending ribs on the external wall thereof, a tubular jacket encircling said body and ribs in spaced relation to provide an annular passage therebetween, the body and jacket having flanges extending radially in spaced relation adjacent at least one end of said body, vane means extending between said flanges adapted to impart a twisting motion to fluid and direct said fluid to said annular passage, means forming a fluid receiving channel communicating with said vanes means through a restricted opening, and fluid discharge means for said annular passage whereby fluid to be heated will be received in said channel under pressure, forced through the vane means to impart a twisting motion thereto, traverse the annular passage in heat exchange relation with the body and be discharged at elevated temperature.

2. The recuperator as defined in claim 1 and wherein said channel is formed by a hood encircling the jacket and having a fluid inlet duct, and said restricted opening to the vane means is formed by providing a relatively narrow arcuate slot between the jacket flange and hood wall.

3. The recuperator as defined in claim 1 and wherein the vane means comprises a plurality of vanes substantially equally spaced circumferentially around the tubular body wall and directed generally tangentially thereto, and each vane terminating in spaced relation to the body ribs.

4. A metallic recuperator comprising a tubular body adapted to have waste gases or the like flowed therethrough, said body having a radially outwardly extending flange at each end thereof and longitudinal ribs on the external wall extending between the flanges, a tubular jacket encircling said body and ribs in spaced relation to provide a longitudinally extending annular passage therebetween, the jacket having a radially outwardly extending flange at each end thereof spaced from the body flange, a plurality of vanes extending between the body and jacket flanges at each end of the recuperator and directed generally tangentially of the body wall whereby a twisting motion will be imparted to fluid passing between the vanes, a hood at each end of the recuperator forming a fluid receiving channel, a fluid duct for each hood, and a restricted opening between each channel and its associated vanes whereby fluid to be heated can be introduced to either channel under pressure, pass between the vanes to impart a twisting motion to the fluid, traverse the annular passage in heat exchange relation with the tubular body, and be discharged from the other channel at elevated temperature.

5. The recuperator as defined in claim 1 and wherein the volumetric capacity of said channel is large relative to the space between said flanges, and the said opening is sufficiently restricted to create a substantially uniform distribution of fluid and pressure within said channel whereby said fluid will be highly accelerated in passing through said opening and between said flanges enabling the vane means to create a high velocity twisting motion to the fluid prior to being delivered to said annular passage.

References Cited in the file of this patent

UNITED STATES PATENTS 2,742,269     Schefels et al.            Apr. 17, 1956

FOREIGN PATENTS 889,950       France                 Oct. 18, 1943